US011831617B2

(12) United States Patent
Lewin et al.

(10) Patent No.: US 11,831,617 B2
(45) Date of Patent: *Nov. 28, 2023

(54) FILE UPLOAD CONTROL FOR CLIENT-SIDE APPLICATIONS IN PROXY SOLUTIONS

(71) Applicant: Microsoft Technology Licensing, LLC, Redmond, WA (US)

(72) Inventors: Guy Lewin, Tel Aviv (IL); Amir Geri, Modi'in (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,957

(22) Filed: Jul. 11, 2022

(65) Prior Publication Data

US 2022/0353245 A1 Nov. 3, 2022

Related U.S. Application Data

(63) Continuation of application No. 16/453,511, filed on Jun. 26, 2019, now Pat. No. 11,405,363.

(51) Int. Cl.
*H04L 9/40* (2022.01)
*G06F 16/93* (2019.01)
(Continued)

(52) U.S. Cl.
CPC ...... *H04L 63/0281* (2013.01); *G06F 16/1734* (2019.01); *G06F 16/93* (2019.01);
(Continued)

(58) Field of Classification Search
None
See application file for complete search history.

(56) References Cited

U.S. PATENT DOCUMENTS 8,752,183 B1 6/2014 Heiderich et al.
8,813,214 B1 8/2014 Mcnair et al.
(Continued)

FOREIGN PATENT DOCUMENTS

CN 107566200 A 1/2018

OTHER PUBLICATIONS

"Non Final Office Action Issued in U.S. Appl. No. 17/068,157", dated Jul. 20, 2022, 20 Pages.
(Continued)

*Primary Examiner* — Mohamed A. Wasel
*Assistant Examiner* — Gregory P Tolchinsky
(74) *Attorney, Agent, or Firm* — Ogilvie Law Firm

(57) ABSTRACT

A computer-implemented method includes receiving, by a proxy device, a document from a service provider in response to a request to the service provider from a client device. The proxy device injects into the document event monitoring code for monitoring user actions on the client device. The proxy device sends the document with the event monitoring code to the client device. The event monitoring code intercepts a user request for a file upload event using a client-side application on the client device. The proxy device receives a client request including file information regarding the file upload event from the event monitoring code. The proxy device determines whether the file upload event should be allowed or blocked based on the received file information and stored policy data.

20 Claims, 6 Drawing Sheets

(51) Int. Cl.
*G06F 16/17* (2019.01)
*H04L 67/02* (2022.01)
*H04L 67/06* (2022.01)

(52) U.S. Cl.
CPC .............. *H04L 63/20* (2013.01); *H04L 67/02* (2013.01); *H04L 67/06* (2013.01)

(56) References Cited

U.S. PATENT DOCUMENTS

| | | | |
|---|---|---|---|
| 10,216,488 | B1 | 2/2019 | Overson et al. |
| 10,248,797 | B1 * | 4/2019 | Shinde .................. H04L 67/568 |
| 10,476,893 | B2 | 11/2019 | Baradaran et al. |
| 10,516,911 | B1 | 12/2019 | Nielsen et al. |
| 10,573,020 | B1 | 2/2020 | Sokolov et al. |
| 10,891,294 | B1 * | 1/2021 | Bong ................. G06F 16/24573 |
| 2002/0188870 | A1 | 12/2002 | Gong et al. |
| 2003/0110391 | A1 | 6/2003 | Wolff et al. |
| 2003/0154399 | A1 | 8/2003 | Zuk et al. |
| 2007/0079379 | A1 | 4/2007 | Sprosts et al. |
| 2008/0091845 | A1 | 4/2008 | Mills et al. |
| 2008/0301796 | A1 | 12/2008 | Holostov et al. |
| 2009/0282483 | A1 | 11/2009 | Bennett et al. |
| 2011/0029393 | A1 | 2/2011 | Apprendi et al. |
| 2012/0233697 | A1 | 9/2012 | Katardjiev et al. |
| 2013/0042323 | A1 | 2/2013 | Narayanaswamy et al. |
| 2013/0042324 | A1 | 2/2013 | Bennett |
| 2014/0310392 | A1 | 10/2014 | Ho |
| 2017/0223049 | A1 | 8/2017 | Kuperman et al. |
| 2018/0077175 | A1 | 3/2018 | Divalentin et al. |
| 2018/0176240 | A1 | 6/2018 | Kopp et al. |
| 2018/0191748 | A1 | 7/2018 | Mcgrew et al. |
| 2018/0332060 | A1 | 11/2018 | Johnson et al. |
| 2019/0114539 | A1 | 4/2019 | Chistyakov et al. |
| 2020/0021590 | A1 | 1/2020 | Jeuk et al. |
| 2020/0110571 | A1 | 4/2020 | Liu et al. |
| 2020/0160942 | A1 | 5/2020 | Lyman et al. |
| 2020/0204520 | A1 | 6/2020 | Pan |
| 2020/0236102 | A1 | 7/2020 | Azulay et al. |
| 2022/0116406 | A1 | 4/2022 | Lewin et al. |

OTHER PUBLICATIONS

International Search Report and Written Opinion Issued in PCT Application No. PCT/US21/043811, dated Nov. 5, 2021, 10 Pages. (copy submitted in parent U.S. Appl. No. 16/453,511, filed Jun. 26, 2019).

"Using Files from Web Applications—Web APIs, MON", Retrieved From: https://web.archive.org/web/20190625015040/https://developer.mozilla.org/en-US/docs/Web/ AP 1/File/Using_files_from_web_applications, Jun. 25, 2019, 17 Pages. (copy submitted in parent U.S. Appl. No. 16/453,511, filed Jun. 26, 2019).

International Search Report and Written Opinion Issued in PCT Application No. PCT/US20/031252, dated Jul. 6, 2020, 14 Pages. (copy submitted in parent U.S. Appl. No. 16/453,511, filed Jun. 26, 2019).

"Final Office Action Issued in U.S. Appl. No. 17/068,157", dated Jan. 20, 2023, 24 Pages.

"Non Final Office Action Issued in U.S. Appl. No. 17/068,157", dated Apr. 10, 2023, 22 Pages.

"Notice of Allowance Issued in European Patent Application No. 20727109.9", dated Apr. 20, 2023, 8 Pages.

"Notice of Allowance Issued in European Patent Application No. 20727109.9", dated Aug. 24, 2023, 2 Pages.

"Final Office Action Issued in U.S. Appl. No. 17/068,157", dated Sep. 15, 2023, 28 Pages.

* cited by examiner

FILE UPLOAD CONTROL FOR CLIENT-SIDE APPLICATIONS IN PROXY SOLUTIONS

RELATED APPLICATION

The present application is a continuation of U.S. application Ser. No. 16/453,511 filed 2019 Jun. 26, and incorporates by reference the entirety of U.S. application Ser. No. 16/453,511.

BACKGROUND

In networked computer systems, proxy services are sometimes used to monitor internet traffic and enforce policy restrictions on user activities. However, when a user of a client device uses a client-side application that executes on the client (e.g., a browser application or word processing application), the proxy service may be unable to monitor the activities undertaken by the user using the client-side application.

For example, a browser application can be used by a user to print or save a document, such as a web page or document file, or upload a document. If the user submits a request regarding the document, the proxy service may not detect the user action to be able to apply policy rules, such as use policies defined by an administrator of a tenant domain. As a result, the user may be able to perform actions that the administrator sought to prevent in defining the policy rules.

It is with respect to these and other technical challenges that the disclosure made herein is presented.

SUMMARY

It is advantageous to apply policy rules defined for a document or domain. However, policies enforced by a proxy service may be unable to detect actions taken by a user on a client utilizing a client-side application on the client. The disclosed technology provides a solution that permits a proxy service to monitor user file upload actions involving a client-side application on the client and apply policy rules to the user actions.

In certain aspects of the disclosed technology, generally speaking, a proxy service injects event monitoring code into a document requested by a client from a service provider. The event monitoring code executes on the client and intercepts user actions with respect to the document. The event monitoring code forwards information regarding the user action to the proxy service, which obtains access data for the document that defines the user actions that are permitted or restricted for the document.

The proxy service may send a message to the event monitoring code indicating whether the user action is permitted or prohibited. If the user action is permitted, the event monitoring code on the client allows normal execution flow for the user action to proceed. If the user action is prohibited, the event monitoring code on the client blocks the execution flow for the user action. In some implementations, the event monitoring code notifies the user that the user action is prohibited.

In order to realize the technical benefits mentioned briefly above, certain implementations of the technologies disclosed herein can perform file upload control by a proxy service of client-side applications in a client that involves receiving a service request from a client, sending the service request to a service provider, and receiving a service response from the service provider that includes a document responsive to the service request. The disclosed technology further involves injecting into the document event monitoring code for monitoring user actions on the client and sending the service response with the document and event monitoring code to the client. Disclosed technology also involves receiving a query message from the event monitoring code with data identifying a user request for a file upload action and searching for policy data pertaining to the request. If policy data pertaining to the request is found that indicates that the user request for a file upload action is permitted, then a query response is sent to the event monitoring code with information indicating that the user request for a file upload action is permitted.

In certain other examples, the event monitoring code for monitoring user actions for the document on the client includes code for intercepting a user request for a file upload action on the client, sending the query message to the proxy service with data identifying the user request for a file upload action, and receiving the query response from the proxy service. If the query response indicates that the user request for a file upload action is permitted, the event monitoring code allows normal execution flow for the user request for a file upload action. If the query response indicates that the user request for a file upload action is not permitted, the event monitoring code blocks execution flow for the user request for a file upload action. In some implementations, if no policy data pertaining to the request is found that indicates that the user request for a file upload action is permitted, the event monitoring code may be configured to generate a message for display on a user interface of the client indicating that the user request is denied.

In a particular implementation, the event monitoring code for monitoring user actions on the client is composed of an event listener before a monitored action. The event monitoring code may include code for filtering events at the first Document Object Model (DOM) element on the capture phase to block and monitor file upload attempts.

As discussed briefly above, implementations of the technologies disclosed herein enable session control by a proxy service to be applied to client-side applications to prevent unauthorized upload of files. Other technical benefits not specifically identified herein can also be realized through implementations of the disclosed technologies.

It should be appreciated that the subject matter described herein can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DETAILED DESCRIPTION

Figure 1:
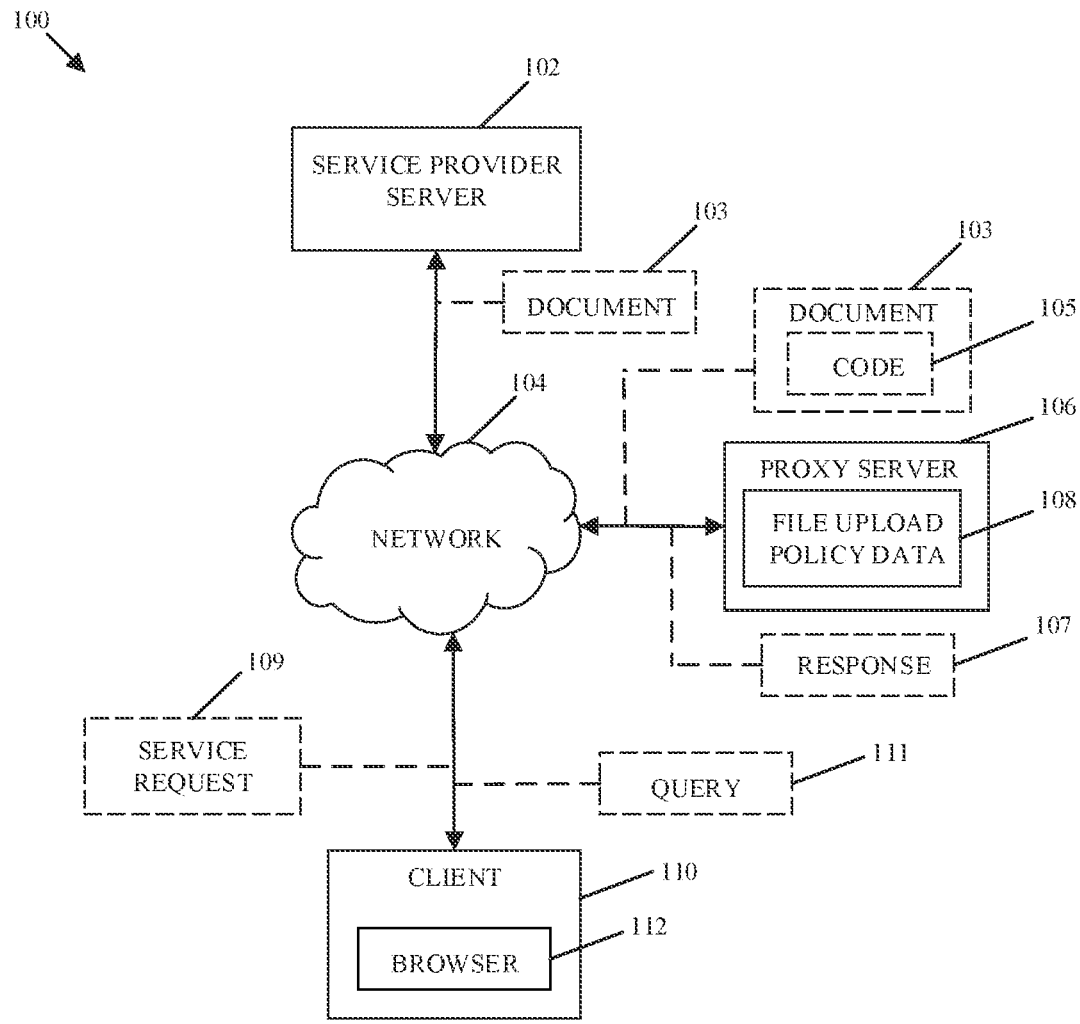
FIG. 1 is a network architecture diagram showing an illustrative example of a networked computing environment involving a client device, a service provider server, and a proxy service server, in accordance with one embodiment.

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

The following detailed description is directed to an approach for file upload control by a proxy service for client-side applications on a client. A service request from a client is received by the proxy service and forwarded to a service provider, which sends a service response with a document. Event monitoring code is injected into the document and the response is forwarded to the client. The event monitoring code intercepts a user file upload action and sends a query to the proxy service to determine whether the user file upload action is permitted. The proxy service checks the user action against policy data and sends a query response to the event monitoring code indicating whether the user file upload action is permitted. If the user file upload action is permitted, the event monitoring code allows normal execution flow. If the user action is denied, the code blocks further execution.

An issue that arises with blocking and monitoring file uploads (or, in general, reading files from filesystem) is that different web services have different protocols between the client side and the server side (e.g., form-multipart, different AJAX methods, JSON post). However, web browsers implement the same API for receiving files from the client itself, no matter what the client-server protocol implementation is. These APIs are: (1) dragging and dropping files and directories (e.g., folders) into the browser; and (2) selecting files and directories from <input type="file"/> (e.g., choosing files from a dialog box). By filtering these APIs at the first (i.e., topmost) Document Object Model (DOM) element on the capture phase, all file upload attempts can be selectively allowed, blocked, and/or monitored, while making sure that no file content is being read by the browser without approval. Synchronous XmlHttpRequest (XHR) requests may be used to maintain events and keep them from cleaning in the garbage collector. In contrast, a proxy solution that only examines network traffic to accomplish file upload blocking and monitoring may not be able to identify all file uploads. The disclosed technology improves computer security by enabling a proxy service to maintain file upload control over documents in a client that can be accessed using a client-side application on the client.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

FIG. 1 is a network architecture diagram showing an illustrative example of a network computing environment 100, which includes a client device 110 in communication with a service provider server (e.g., web service provider) 102, and a proxy service server 106, through network 104. Client device 110 can be a device, such as a personal computer or a smart phone, which a user utilizes to access resources through the network 104, such as services provided by service provider server 102, and can utilize a client-side application 112 through a user interface of the client device 110. In the illustrated example, the client-side application 112 is a web browser. Content is rendered by the web browser and displayed in display regions of the user interface of the client device 110.

Service provider server 102 supports services and content that can be accessed by client 110 through proxy server 106 via network 104. When client 110 attempts to access services and content on server 102, the access is routed through proxy server 106, which monitors the message traffic between client 110 and server 102.

Client 110 may send a service request 109 (e.g., a Universal Resource Locator (URL)) to server 102. Proxy server 106 receives the service request 109 and forwards the request to server 102. Server 102 generates a service response to the service request (e.g., a document 103 referenced by the URL), and sends the document 103 to proxy server 106. Proxy server 106 injects event monitoring code 105 into the document 103, and forwards the document 103 with the injected code 105 to client 110. Client 110 stores the document 103 locally along with the injected event monitoring code 105. While the term "document" may be used herein to mean an HTTP document, such a document can comprise or include a variety of content, such as text, images and graphics.

The event monitoring code 105 intercepts an action (e.g., a file upload action) from client-side application 112, and sends a query 111 to proxy server 106 with information identifying the document 103, the application 112, and the file upload action. Proxy server 106 receives the query 111 from event monitoring code 105 and searches file upload policy data 108 for relevant policy data. Based on the policy data 108, the proxy server 106 determines whether the file upload action is permitted. Proxy server 106 sends a response 107 to the event monitoring code 105 in client 110 with an indication as to whether the file upload action is permitted or denied. The policy data 108 may include a variety of different policy rules to define which file uploads are to be allowed, which file uploads are to be blocked, and which file uploads are to be monitored (e.g., logged into an event log). The policy rules may be based on a variety of factors, such as file size, file content, and file names, including file extensions.

As discussed further below, the event monitoring code 105 can allow normal execution flow to proceed for a file upload action if the response 107 from proxy server 106 indicates that the action is permitted. If the file upload action is indicated as denied in the response 107 from proxy server 106, the event monitoring code 105 blocks normal execution flow for the file upload action. In certain implementations, event monitoring code 105 and/or proxy server 106 may provide a notification to the user of client device 110 indicating that the user requested file upload action is prohibited. The event monitoring code 105 may be a script code, such as, but not limited to, JavaScript.

The disclosed technology provides an approach whereby a proxy service can extend file upload control on a client even when a user utilizes client-side applications residing on the client. The disclosed technology may be implemented in the proxy service without generally requiring modifications to the client or service provider. As a result, for example, the disclosed technology can be implemented to permit a tenant administrator to extend file upload control to client's utilizing client-side applications.

The architecture and messaging examples shown and described herein are illustrative and do not limit the scope of the disclosed technology. One of skill in the art will readily recognize that other architectures and message protocols may be utilized in keeping with the disclosed technology.

Figure 2A:
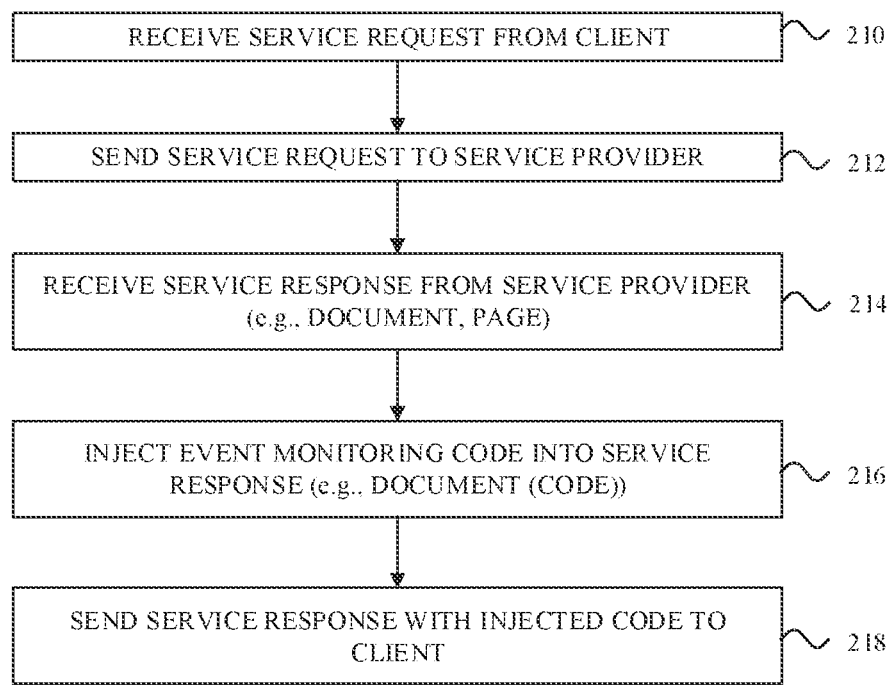
FIGS. 2A-2C are flow diagrams showing an illustrative example of a process in a proxy service in accordance with the disclosed technology, where event monitoring code is injected into a document from the service provider and sent to the client device in accordance with one embodiment.
Figure 2B:
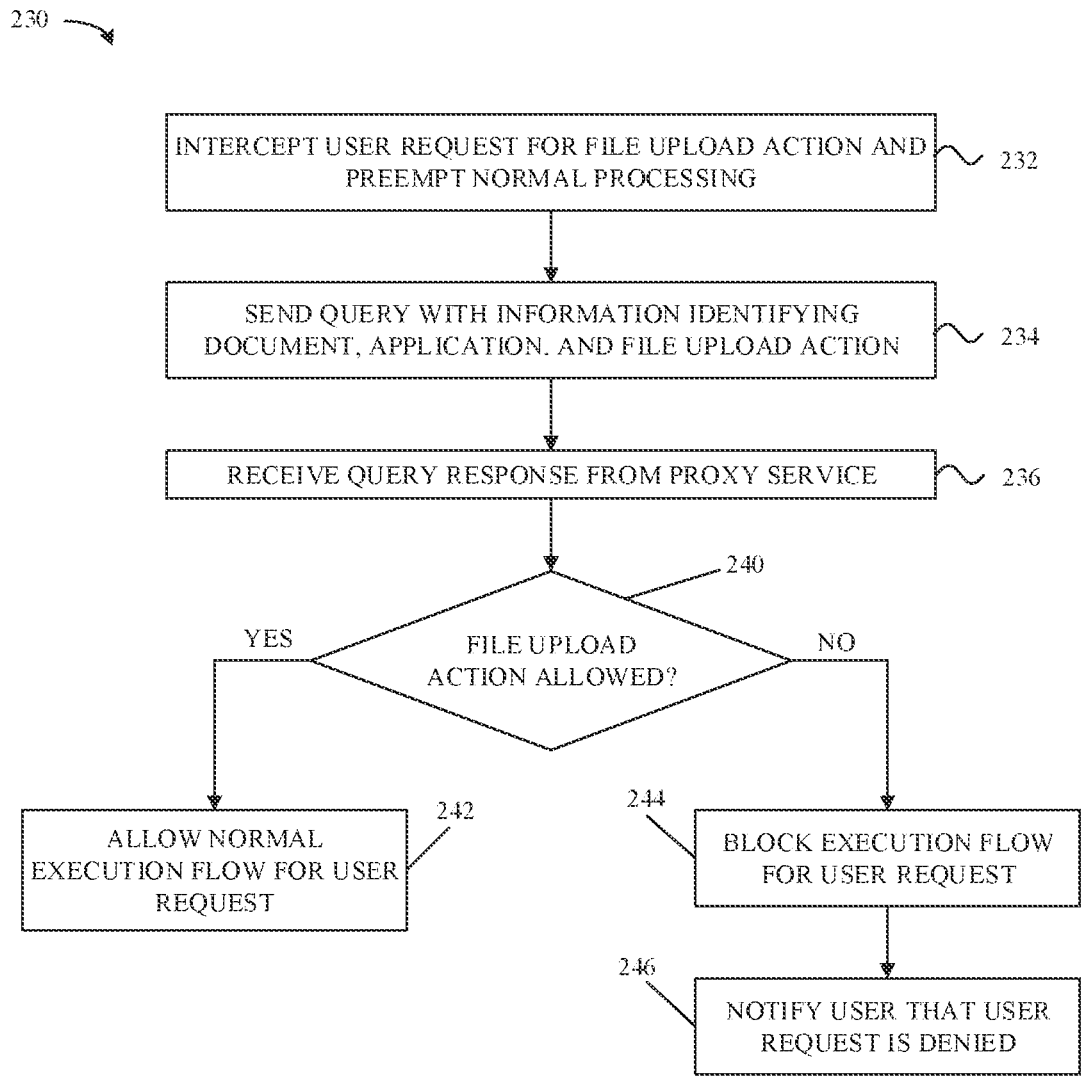
Figure 2C:
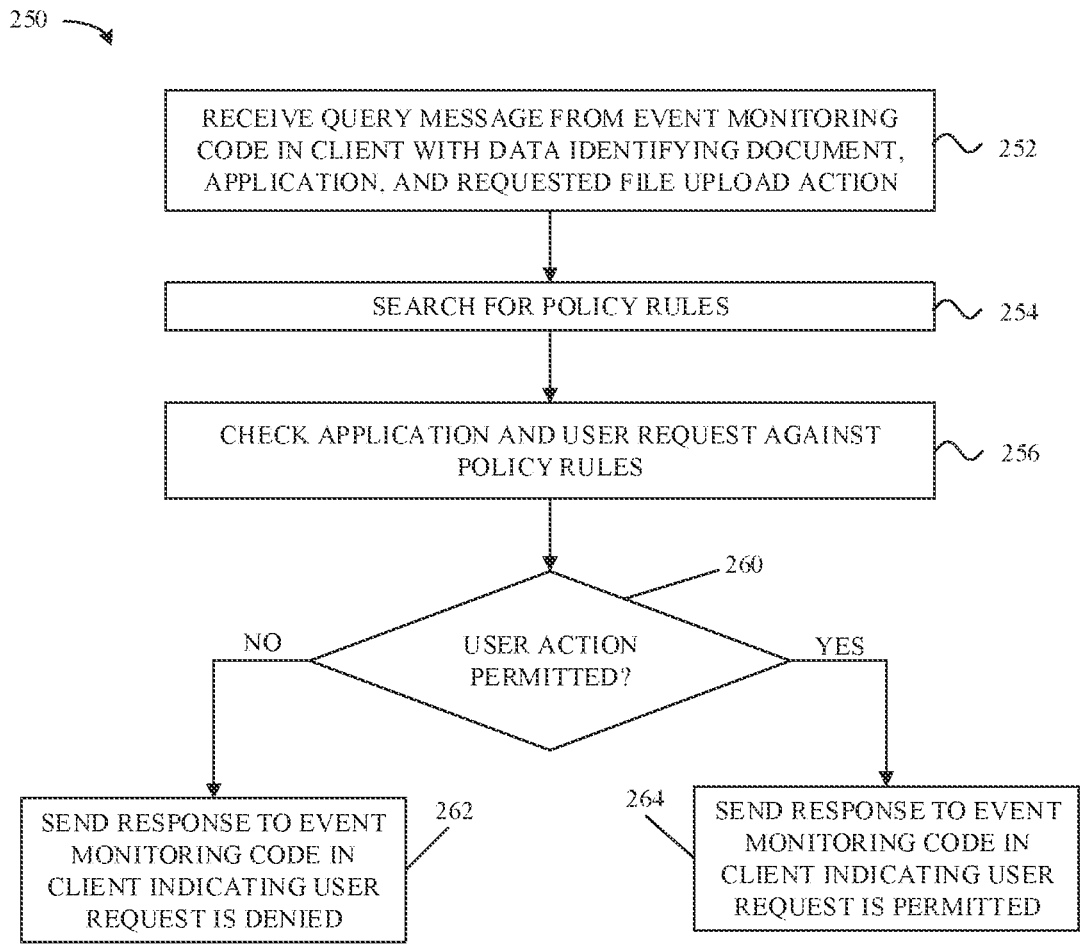

FIGS. 2A-2C are flow diagrams showing an illustrative example of processes executing in client 110 and proxy server 106 in accordance with one embodiment. FIG. 2A is a flow diagram showing an illustrative example of a process 200 in a proxy service server in accordance with the disclosed technology. The processes shown assume that a proxy service server has been established with regard to a client to receive and relay communications between the client and a service provider.

In the example of FIG. 2A, a proxy service server injects event monitoring code into a document received from a service provider server in response to a request from a client and forwards the document with the injected event monitoring code to the client. At 210, a proxy service server, such as proxy server 106 of FIG. 1, receives a service request from a client, such as client 110 of FIG. 1. For example, the service request can be an HTTP request with a URL referencing content on a service provider. At 212, the proxy service server forwards the service request to a service provider, such as server 102 in FIG. 1.

At 214, the proxy service server receives a service response from the service provider with a document, such as an HTML, document or page. At 216, the proxy service server injects event monitoring code into the received document. At 218, the proxy service server sends the document with the injected event monitoring code to the client. The event monitoring code injected into the document may inject one or more decision points in the document to achieve visibility over user client-side action. The injected decision points may generally be synchronous and preemptive in order to obtain input from a proxy service before the user's client-side action, such as a file upload attempt, is completed.

FIG. 2B is a flow diagram showing an illustrative example of a process 230 in a client for event monitoring code injected into a document, where the event monitoring code intercepts a user request for a file upload action and provides for file upload control in accordance with the disclosed technology. At 232, the event monitoring code intercepts a user request for a file upload action using an application on the client and preempts normal processing of the requested user file upload action. At 234, the event monitoring code queries the proxy service server with information identifying the document, application and user requested file upload action. The event monitoring code waits to receive a response to the query from the proxy service server, which is received at 236. If the response to the query indicates that the user requested file upload action is permitted, control branches at 240 to 242, where the event monitoring code allows normal execution flow to continue for the user requested file upload action.

If the response to the query indicates that the user requested file upload action is not permitted, then control branches at 240 to 244 to block further execution flow for the user requested file upload action. Thus, the user is prevented from completing a prohibited file upload action in the client. In some implementations, control may continue to 246 to generate a notification to the user that the user requested file upload action is denied.

FIG. 2C is a flow diagram showing an illustrative example of a process 250 in a proxy service server for performing session control for a document in a client along with event monitoring code injected into the document in accordance with the disclosed technology. In this example, process 250 interacts with the event monitoring code process 230 of FIG. 2B to apply policy rules to user file upload actions on the client. At 252, the proxy service server receives a query message from the event monitoring code in the client with data identifying the document, application and requested user file upload action, such as the query sent at 234 in event monitoring code process 230. At 254, the proxy service server searches for policy rules based on the received query message. At 256, the application and requested user file upload action are checked against policy rules.

If the policy rules indicate that the user file upload action is not permitted, control branches at 260 to 262 to send a response to the event monitoring code in the client that indicates that the user file upload request is denied. If the policy rules indicate that the user file upload action is permitted, then control branches at 260 to 264 to send a response to the event monitoring code in the client that indicates that the user file upload request is permitted. The event monitoring code acts upon the response from process 250 as described above.

One example of a scenario for an application of the disclosed technology involves asserting a client-side file upload policy for when a user attempts to upload a file. In this scenario, a user may utilize a browser client application to view a web page (e.g., document), and initiate a file upload action. User actions on a web page, such as attempting to upload a document, create JavaScript events. JavaScript event propagation includes three phases: (1) capture (down); (2) target; and (3) bubbling (up). The event monitoring code includes event listeners that, during initialization, register for file upload events on the window (i.e., the topmost object) of the DOM on the capture phase. This helps to ensure that the event monitoring code for monitoring file uploads is the first code that runs when a user attempts a file upload.

Figure 3:
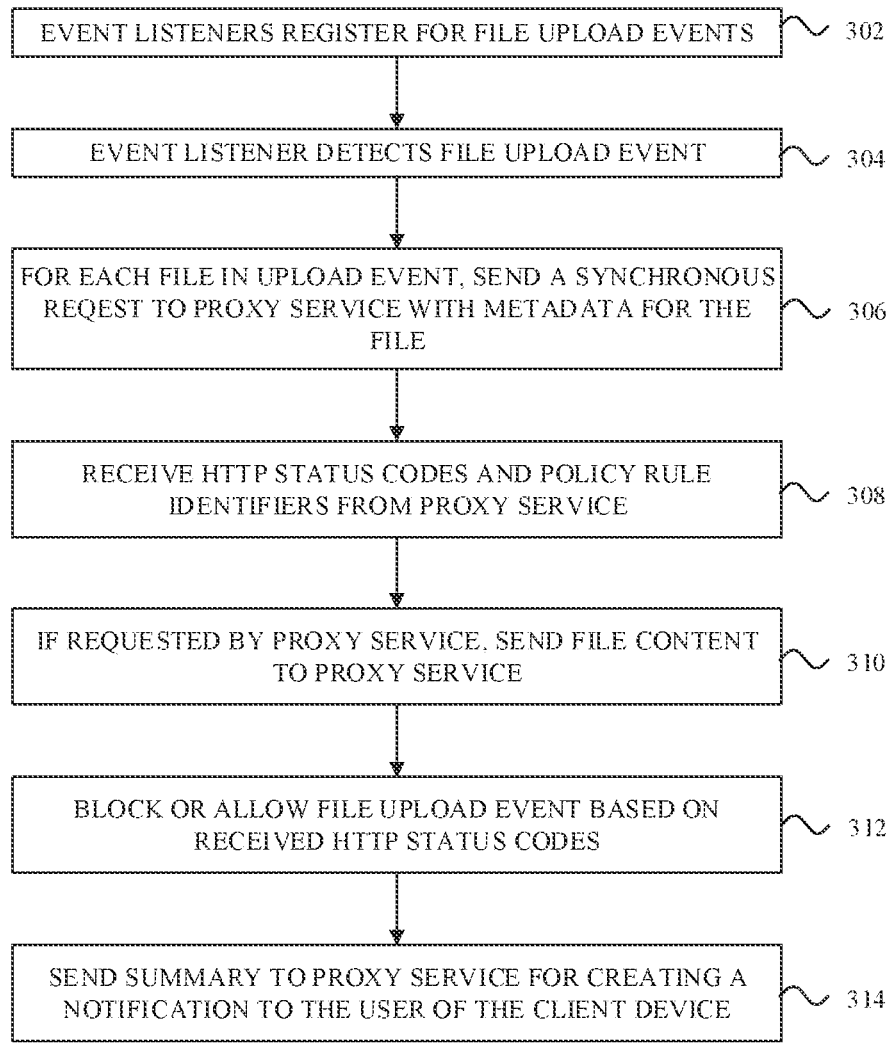
FIG. 3 is a flow diagram showing an illustrative example of a file upload monitoring process in accordance with one embodiment.

FIG. 3 is a flow diagram showing an illustrative example of a file upload monitoring process 300 in accordance with the disclosed technology. At 302 in process 300, event listeners in the event monitoring code register for file upload events. In one implementation, the event listeners include a "drop" event listener to handle file upload attempts via dragging and dropping, and a "change" event listener to handle file upload attempts via a dialog box.

At 304 in process 300, a user initiates a file upload action, and an event listener in the event monitoring code detects and intercepts the file upload event at the capture phase of event propagation. At 306, for each file in the file upload event, the event monitoring code sends a synchronous request to the proxy service server with metadata for the file. In one example, when a file upload attempt is detected, the event monitoring code sends a synchronous XmlHttpRequest (XHR) to the proxy service server with current data regarding the file upload action that is requested. In one implementation, the current data that is initially sent to the proxy service is metadata (e.g., file name and file size) for the file to be uploaded, and does not include any file content. In some implementations, if the file size is below a threshold size, the file content is sent along with the metadata in the initial XHR sent to the proxy service.

At 308 in process 300, the event monitoring code receives an HTTP status code from the proxy service for each file in the file upload event in response to the synchronous request or requests sent at 306. The event monitoring code can interpret the received HTTP status codes with respect to the user requested file upload action. For example, if the status code received from the proxy service is "417", the event monitoring code may interpret this as "Need more Data", and may cause additional data regarding the file upload attempt to be sent to the proxy service. In one implementation, when the proxy service indicates that more data is needed, the event monitoring code may cause the file content to be sent to the proxy service, as indicated at 310 in process 300, and then wait for a second HTTP status code from the proxy service, which will indicate whether the file is allowed or blocked.

At 312 in process 300, the event monitoring code blocks the file upload event or allows the file upload event to proceed based on the received HTTP status codes. For example, if the status code is "403", the event monitoring code may interpret this as "Unauthorized", and block further execution flow for the user requested file upload action. The user can also be informed that the requested file upload action is blocked using a notification in the user interface of the client. If the status code received from the proxy service is "202", the event monitoring code may interpret this as "Accepted", and allow normal execution flow for the user requested file upload action to continue.

In addition to receiving HTTP status codes at 308, the event monitoring code also receives policy rule identifiers from the proxy service. When the proxy service determines that the upload of a particular file is to be blocked, in addition to sending the "403" status code, the proxy service also sends a JSON in the body of the response that identifies the policy rule that caused the file upload to be blocked. Similarly, when the proxy service determines that the upload of a particular file is to be allowed, but monitored, in addition to sending the "202" status code, the proxy service also sends a JSON in the body of the response that identifies the policy rule that caused the file upload to be monitored. If no policy rule matches a particular file upload, the proxy service will return the appropriate status code with an empty JSON.

In one implementation, when a file upload event includes multiple files, the event monitoring code may separately query the proxy service for each individual file. If the proxy service indicates that any one of the files is blocked, the event monitoring code will block the file upload for all of the files included in the file upload event, and a notification may be provided to the user indicating that the upload event was not authorized, and identify files that were authorized and files that were unauthorized. The event monitoring code may also maintain a list of all of the files that have been allowed and all of the files that have been blocked. For each file in the list that was blocked or monitored, the list includes an associated identification of the policy rule that caused that file to be blocked or monitored. In one implementation, after all of the files in a given file upload event have been processed by the proxy service, the event monitoring code in the client sends a summary to the proxy service at 314 in process 300. The summary may include a list of allowed files and blocked files, and for each file that was blocked or monitored, the list may include an associated identification of the policy rule that caused that file to be blocked or monitored. The proxy service may use the summary to generate a notification to the client, such as a notification indicating that an upload event was not authorized, and identify files that were authorized and files that were unauthorized.

In some implementations, the event monitoring code may do a periodic (e.g., once per minute) background check to see if relevant file upload policies have been established in the proxy service. If no policies have been established, the event monitoring code may allow file uploads without performing a check with the proxy service.

One of skill in the art will readily appreciate that a variety of approaches may be utilized for file upload control in a proxy service for client-side applications in a client without departing from the scope of the disclosed technology. The approach of the disclosed technology enables policy rules to be applied in a client even when a client-side application is utilized by a user to request a file upload action, which improves the security and control of clients. It is to be appreciated that, while embodiments disclosed herein have been presented primarily in the context of performing file upload control in a proxy service for client-side applications in a client, the technologies disclosed herein can be similarly applied to other contexts where similar functionality is utilized to perform file upload control for client-side applications in a client.

Figure 4:
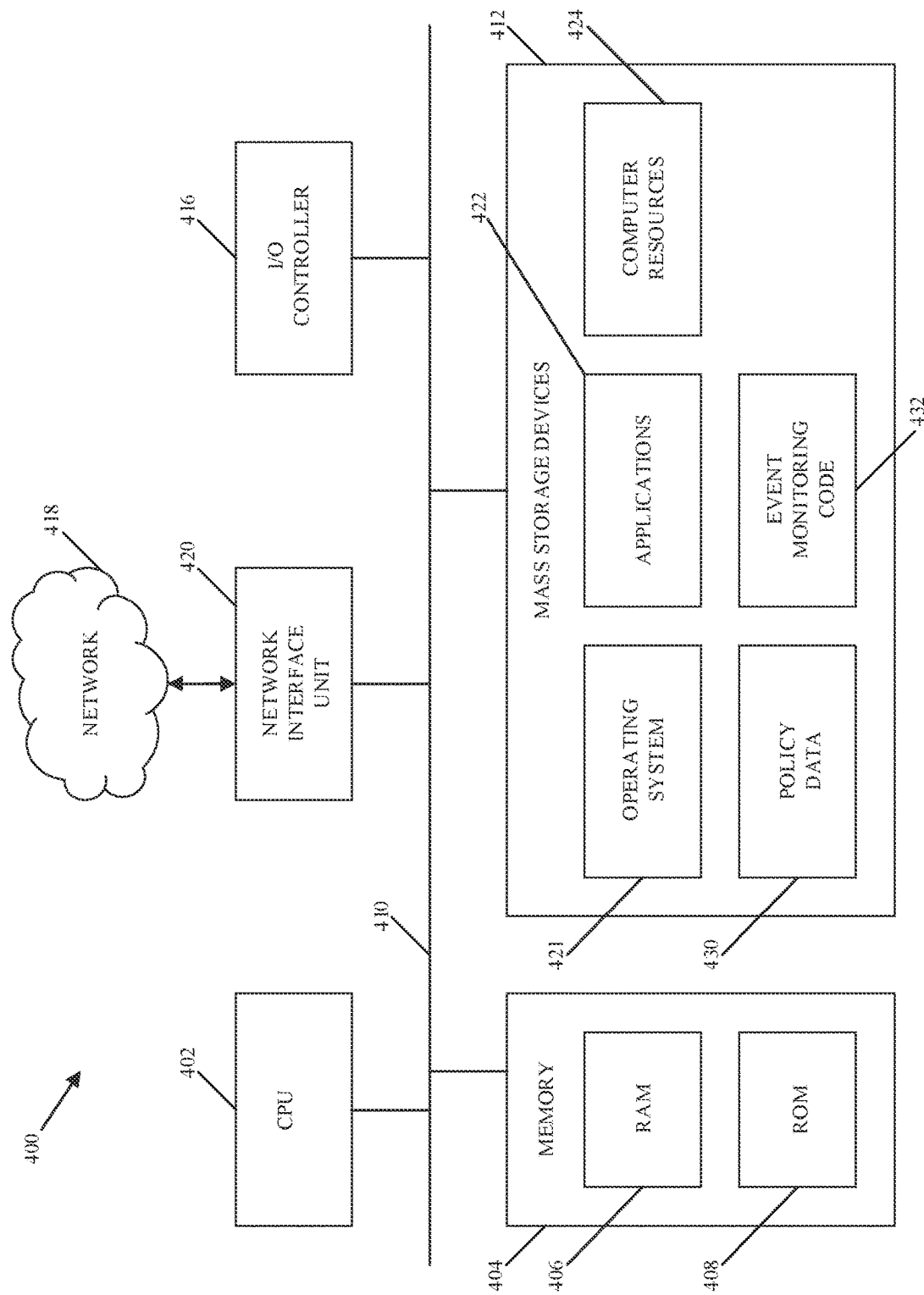
FIG. 4 is a computer architecture diagram showing an illustrative computer hardware and software architecture for a computing device that can implement aspects of the technologies presented herein.

FIG. 4 is a computer architecture diagram that shows an architecture for a computer 400 capable of executing the software components described herein. The architecture illustrated in FIG. 4 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 400 shown in FIG. 4 can be utilized to implement a computing device capable of executing any of the software components presented herein. For example, and without limitation, the computing architecture described with reference to FIG. 4 can be utilized to implement the client 110, proxy service server 106, and service provider server 102 illustrated in the system 100 of FIG. 1, which is capable of executing the various software components described above, such as the operations of the processes illustrated in FIGS. 2A-2C and 3.

The computer 400 illustrated in FIG. 4 includes a central processing unit ("CPU") 402, a system memory 404, including a random-access memory ("RAM") 406 and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, may be stored in the ROM 408. The computer 400 further includes one or more mass storage devices 412 for storing an operating system 421, application programs 422, and other types of programs and data including, but not limited to, computer resources 424, policy data 430 and event monitoring code 432. The computer resources 424, policy data 430 and event monitoring code 432 can be stored in different storage devices from one another.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 418. The computer 400 can connect to the network 418 through a network interface unit 420 connected to the bus 410. It should be appreciated that the network interface unit 420 can also be utilized to connect to other types of networks and remote computer systems. The computer 400 can also include an input/output controller 416 for receiving and processing input from a number of other devices, including a keyboard, mouse, touch input, or electronic stylus (not shown in FIG. 4). Similarly, the input/output controller 416 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

One embodiment of the present disclosure is directed to a computer-implemented method, which includes receiving, by a proxy device, a document from a service provider in response to a request to the service provider from a client device. The method includes injecting into the document, by the proxy device, event monitoring code for monitoring user actions on the client device. The method includes sending, by the proxy device, the document with the event monitoring code to the client device. The method includes intercepting, by the event monitoring code, a user request for a file upload event using a client-side application on the client device. The method includes receiving, by the proxy device, a client request including file information regarding the file upload event from the event monitoring code. The method includes determining, by the proxy device, whether the file upload event should be allowed or blocked based on the received file information and stored policy data.

The method may further include sending to the client device, by the proxy device, a response indicating whether the file upload event is permitted or that more information is needed for the proxy device to make a determination. The response sent to the client device may include a policy rule identifier identifying a policy rule that applies to a file identified in the file information. The method may further include: if the response indicates that the file upload event is permitted, allowing, by the event monitoring code, the file upload event to occur; and if the response indicates that the file upload event is not permitted, blocking, by the event monitoring code, the file upload event from occurring. If the response indicates that the file upload event is not permitted, the method may include notifying the user that the file upload event is not permitted. If the response indicates that more information is needed, the method may further include causing, by the event monitoring code, file content for the file upload event to be sent to the proxy device.

The event monitoring code may include script code. The response sent by the proxy device to the client device may include a hypertext transfer protocol (HTTP) status code that indicates whether the file upload event is permitted or not permitted, or whether more information is needed for the proxy device to make a determination.

The injecting into the document event monitoring code for monitoring user actions on the client device may include adding at least one event listener to detect file upload events. The at least one event listener may detect file or directory change upload events. The at least one event listener may detect file or directory drop upload events. The at least one event listener may register for file upload events on a topmost element of a Document Object Model (DOM) on a capture phase of event propagation. The client request may be a synchronous request. The file information received by the proxy device may include metadata regarding a file to be uploaded and not file content.

Another embodiment of the present disclosure is directed to a proxy system for file upload control of client-side applications in a client. The system includes one or more processors, and one or more memory devices in communication with the one or more processors. The one or more memory devices have computer-readable instructions stored thereupon that, when executed by the processors, cause the processors to perform a method comprising: receiving a document from a service provider in response to a request to the service provider from a client device; injecting into the document event monitoring code for monitoring file upload events on the client device; sending the document with the event monitoring code to the client device; receiving a client request including file information regarding a file upload event intercepted by the event monitoring code at the client device; determining whether the file upload event should be allowed or blocked based on the received file information and stored policy data; and sending to the client device a response based on the determination of whether the file upload event should be allowed or blocked.

The response sent to the client device may include a hypertext transfer protocol (HTTP) status code that indicates at least one of the following: the file upload event is permitted; the file upload event is not permitted; and more information is needed to make a determination. The event monitoring code may include at least one event listener to detect file upload events. The at least one event listener may register for file upload events on a topmost element of a Document Object Model (DOM) on a capture phase of event propagation.

Yet another embodiment of the present disclosure is directed to one or more computer storage media having computer executable instructions stored thereon which, when executed by one or more processors, cause the processors to execute a method in a proxy service for file upload control of client-side applications in a client, the method comprising: receiving a document from a service provider in response to a request to the service provider from a client device; injecting into the document event monitoring code for monitoring user file upload actions on the client device; sending the document with the event monitoring code to the client device; receiving a synchronous client request including file metadata regarding a file upload event intercepted by the event monitoring code at the client device; determining whether the file upload event should be allowed or blocked based on the received file metadata and stored policy data; and sending to the client device a response based on the determination of whether the file upload event should be allowed or blocked.

The event monitoring code may include at least one event listener to detect a file or directory drop upload event and a file or directory change upload event.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A computer-implemented method performed by a proxy device, the method comprising:
   injecting an event monitoring code into a document which includes a service provider response to a request from a client device, the event monitoring code including instructions configured to upon execution intercept a user request for a file upload event;
   sending the document with the event monitoring code to the client device;
   receiving file information regarding the file upload event from the event monitoring code; and
   determining at least one of the following, based on the received file information and on a stored policy data: the file upload event should be allowed, the file upload event should be blocked, or additional information is needed to determine whether the file upload event should be allowed or be blocked.

2. The method of claim 1, and further comprising:
sending to the client device a proxy device response indicating whether the file upload event is permitted or indicating that more information is needed for the proxy device to make a determination.

3. The method of claim 2, wherein the response sent to the client device includes a policy rule identifier identifying a policy rule that applies to a file identified in the file information.

4. The method of claim 2, wherein the proxy device response includes a hypertext transfer protocol (HTTP) status code that indicates whether the file upload event is permitted or not permitted, or whether more information is needed for the proxy device to make a determination.

5. The method of claim 1, wherein the event monitoring code includes script code.

6. The method of claim 1, wherein injecting event monitoring code into the document includes adding an event listener which includes instructions configured to upon execution detect a file upload event.

7. The method of claim 1, wherein the request from the client device is a synchronous request.

8. The method of claim 1, wherein the file information received by the proxy device includes metadata regarding a file to be uploaded.

9. One or more computer storage media having computer executable instructions stored thereon which, when executed by one or more processors, cause the processors to execute a method in a proxy service for file upload control of client-side applications in a client, the method comprising:
injecting an event monitoring code into a document which includes a service provider response to a request from a client device, the event monitoring code including instructions configured to upon execution monitor a user file upload event;
sending the document with the event monitoring code to the client device;
receiving a synchronous client request including file metadata regarding a file upload event intercepted by the event monitoring code at the client device;
determining whether the file upload event should be allowed or blocked based on the received file metadata and stored policy data; and
sending to the client device a response based on the determination of whether the file upload event should be allowed or blocked.

10. A computer-implemented method performed by a client device, the method comprising:
sending a client request to a service provider;
receiving a document which includes a service provider response to the client request and also includes an event monitoring code;
intercepting, by execution of the event monitoring code, a user request for a file upload event;
sending to a proxy device, by execution of the event monitoring code, file information regarding the file upload event; and
receiving from the proxy device at least one of: a determination the file upload event should be allowed, a determination the file upload event should be blocked, or an indication that more information is needed for the proxy device to make a determination whether the file upload event should be allowed or be blocked.

11. The method of claim 10, wherein the receiving includes receiving the determination that the file upload event should be blocked, and the method further comprises blocking, by execution of the event monitoring code, the file upload event from occurring.

12. The method of claim 11, wherein the method further comprises notifying a user that the file upload event is not permitted.

13. The method of claim 10, wherein the receiving includes receiving the indication that more information is needed for the proxy device to make the determination, and the method further comprises causing, by execution of the event monitoring code, file content for the file upload event to be sent to the proxy device.

14. The method of claim 10, wherein the method further comprises detecting, by execution of an event listener of the event monitoring code, a file upload event.

15. The method of claim 14, wherein the file upload event includes a file upload attempt made via a dialog box.

16. The method of claim 14, wherein the file upload event includes a directory upload attempt made via a dialog box.

17. The method of claim 14, wherein the file upload event includes a file upload attempt made via a drag and drop.

18. The method of claim 14, wherein the file upload event includes a directory upload attempt made via a drag and drop.

19. The method of claim 10, wherein the method further comprises an event listener of the event monitoring code registering for a file upload event.

20. The method of claim 19, wherein the event listener registers for a file upload event on a topmost element of a Document Object Model (DOM) on a capture phase of event propagation.

* * * * *